J. Kingsland Jr. Sheet 1. 2 Sheets.
Pulp Grinder.

No. 744. Reissued Jun. 28, 1859.

Witnesses
Wm. H. Mitchell
Andrew DeLacy

Inventor
Joseph Kingsland Jun

J. Kingsland Jr. Sheet 2. 2 Sheets.
Pulp Grinder.

No. 744. Reissued Jun. 28, 1859.

Witnesses
Wm. H. Pitts
Andrew DeLany

Inventor
Joseph Kingsland Jun.

UNITED STATES PATENT OFFICE.

JOSEPH KINGSLAND, JR., OF FRANKLIN, NEW JERSEY.

IMPROVEMENT IN THE PROCESS OF GRINDING PAPER-PULP.

Specification forming part of Letters Patent No. 16,316, dated December 23, 1856; Reissue No. 744, dated June 28, 1859

*To all whom it may concern:*

Be it known that I, JOSEPH KINGSLAND, Jr., of Franklin, in the county of Essex and State of New Jersey, have invented a new and useful process of grinding fibrous vegetable matter in water to pulp for the manufacture of paper, of which the following is a full, clear, and exact description, reference being had to the accompanying drawings, which make part of this specification, and in which—

Figure 1:
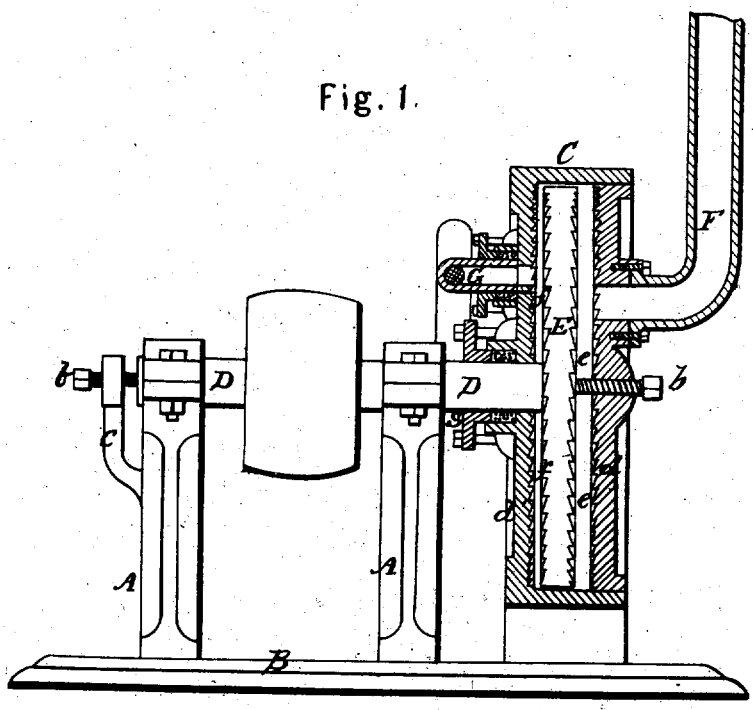
Figure 2:
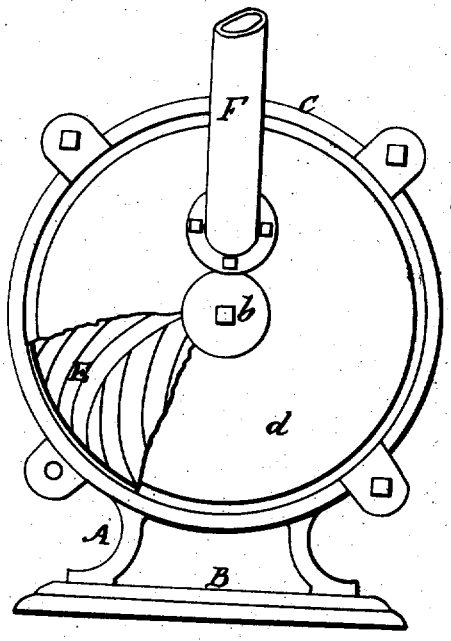
Figure 3:
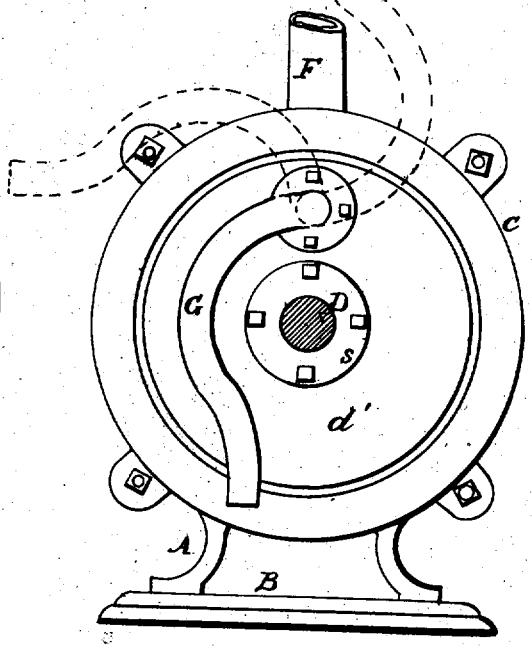

Figure 1 represents a vertical section of a "beating" or "stuff engine" suitable for carrying into effect my improved process. Fig. 2 represents an elevation of one end, and Fig. 3 an elevation of the other end, of the same.

The stock from which paper is made usually consists of rags, although in some instances fibrous substances which have not been worked into fabrics are employed for this purpose; but whatever the stock may be the fibers usually vary in strength and in fineness. These fibrous substances in the process of manufacturing them into paper are reduced to what is known as "pulp" by grinding, or rather beating, them in water. The process by which this is accomplished is usually worked in two machines, termed, respectively, the "washing-engine" and the "stuff-engine." In the former—the washing-engine—the rags or other fibrous substances are cleaned and rough ground, and after undergoing this part of the process are termed "half-stuff;" and the final process of grinding the half-stuff into pulp suitable for making paper is worked in the stuff-engine. This stuff-engine consists of an annular trough or vat, in which a current of water, with the half-stuff to be reduced to pulp floating therein, may be made to flow around. This vat has a fixed grinding bed or concave placed across the bottom thereof, and occupying only a portion of the length of the circuit of the vat. Over this bed is mounted a rotating cylinder, leaving a narrow space between the two through which the water and fibers can pass. The surfaces, both of the bed and of the cylinder, are armed with blunt steel knives working in the manner of shear-blades, but not passing by each other in actual contact, like shears, nor as sharp, as the object is to bruise and tear, rather than to cut, the fibers. This bed and cylinder constitute the grinding portion of the machine, and they also perform the office or functions of feeding in the material to their own grinding, or rather beating, action, and of discharging it. They form, as it were, a partition across the trough or vat, so that the water, with the fibers floating in it, cannot flow around in the annular trough without passing between them, the current of water being induced by the rotation of the cylinder, the knives of which strike the water and the fibers suspended in it, and force them through the space between the cylinder and bed. This establishes a current around in the annular vat, which continues while the cylinder is in motion, and keeps the whole mass of fibrous substance passing repeatedly through between the knives until the fiber is reduced to pulp of the required fineness.

It necessarily follows from this mode of procedure or mode of operation—

First. That the annular trough or vat must be of sufficient capacity to contain at once all the stuff to be worked, and hence that it must occupy a considerable area in the factory.

Second. That at any one time there is but a small portion of the circumference of the cylinder actually performing the function of grinding—viz., a portion equal to the segment of the bed, which must of necessity be but a small part of a circle, or the stuff could not pass around.

Third. There is no feeding in of the stuff to the action of the grinding-surfaces other than what is induced by the rotation of the cylinder; hence their must be a limit to the velocity of the cylinder, for if rotated at too high a velocity the centrifugal force would repel the stuff and prevent the feeding in. The limit of velocity is about two hundred revolutions per minute—a velocity far below that which could be given, and still maintain an efficient grinding action on the fibrous substances, thus requiring a much larger number of engines than would be necessary to do a given amount of work if the cylinder could be rotated at the maximum velocity, limited alone by efficiency of grinding action.

Fourth. The whole of the stuff must continue to be acted upon by the knives until the hardest coarsest, and most refractory fibers are reduced to the required degree of fineness, in consequence of which the finer, softer, and less refractory fibers are two much reduced, thereby inducing a serious waste and want of regularity in the pulp and in the resulting paper.

The leading objects of my invention are, first, to dispense with the annular vat heretofore employed, thereby saving much room; second, to render efficient the whole or nearly the whole surface of the grinder, thereby greatly increasing the effective capacity of the machinery employed; third, to separate the feeding action from the grinder, so that the velocity of the grinder may be greatly increased without thereby stopping the feeding in of the stuff; and, fourth, separating the discharging action from the grinder. And these improved results I have accomplished by my improved process, which consists in subjecting the fibrous substance suspended in water to the grinding action within a closed vessel, and supplied thereto by the hydraulic pressure of a descending column of the water containing such fibrous substances, and permitting it to escape therefrom so soon as the fiber is sufficiently reduced, but not before.

By reference to the accompanying drawings will be more fully understood the construction and operation of the stuff-engine which I have invented for and prefer to use in carrying into effect my improved process. It consists of a bed-plate, B, which supports two standards, A A, and a hollow cylinder, C, whose diameter is equal to about four times its length. In a line with the axis of this cylinder a shaft, D, is mounted in bearings in the head of the standards A A. In a bracket, *c*, on the outer standard A and in a boss at the middle of the outer head, *d*, of the cylinder *C* set-screws *b* are placed in a line with the axis of the shaft D. The object of these set-screws is to permit the shaft D to have a regulated amount of end-play in its bearings, for a purpose which will presently be described, or to adjust it for any special purpose at any given point within the range of its end-play. This shaft passes through a stuffing-box, S, on the inner head, *d'*, of the cylinder C, and projects about two-thirds of the way across the space within the cylinder toward its outer head, *d*. On this projecting end of the shaft D a disk, E, is secured at right angles with the shaft and concentric with it and the cylinder or case. This disk is somewhat less in diameter than, and in thickness about half the length of, the interior of the cylinder, so as to leave between it and the heads and periphery of the cylinder a free space for a current of water and rags, half-stuff, or paper-pulp to flow through. The inner surface of the heads of the cylinder and the sides of the disk are grooved in the usual manner of metallic grinders; or they may be armed with teeth or knives of any suitable kind for working fibers into pulp. An orifice is made in each head of the cylinder. The orifice in the outer head, *d*, is connected by a pipe, F, with a tank above, containing the fibrous substance mingled with water and ready to be ground into pulp. With the orifice in the inner head, $d^1$, a pipe, G, is connected, which conducts off to a proper receptacle the pulp discharged from the machine.

The operation of the engine is as follows: Rotary motion is communicated to the shaft D through the pulley near its middle, and the set-screws *b* are so adjusted as to allow the shaft to have sufficient end play to permit the disk E to run freely from end to end of the cylinder C, to grind close at either end, or at both, as may be required; or, if it should so happen that the fiber is of uniform strength and homogeneous, the disk E may be fixed in one position by the set-screws *b*, as represented in Fig. 1 of the drawings. The mixed fibrous substance and water may be now let into the feed-pipe F from the tank above, and the hydraulic pressure will force it into the cylinder through the space *e*, between the disk and the outer head, *d*, round the periphery of the disk and through the space *f* to the orifice of the discharge-pipe G, where it will leave the cylinder, and, entering the discharge-pipe, will pass through the same into any suitable receptacle.

The centrifugal action of the disk will cooperate with the hydraulic pressure to cause the fibrous substance to pass from the feed-orifice, where the motion of the disk is slow and but little grinding takes place, toward the periphery, where the motion is greater and the grinding energetic; but when the current of water, charged with fiber, turns the periphery of the disk and enters the space *f* on the opposite side its passage to the discharge-orifice is retarded by the centrifugal action of the disk. This retarding force acts with the greatest effect upon the largest fibers, while those which have been most reduced are carried by the current of water to the discharge-aperture, leaving the coarser fibers behind until sufficiently reduced. In this way the reduced fibers are withdrawn from the action of the grinder, while the coarser fibers are left for further reduction. This separation of the finer from the coarser fibers during the process of grinding is facilitated by the increased mobility which they acquire by reduction.

The fineness of the grinding, it will be seen, depends upon the hydraulic pressure on the feed and the speed with which the disk of the grinder runs, while the rate of feeding depends upon the pressure of the descending column alone.

In case a knot or lump of fiber should be fed into the grinder, the disk will yield and move toward the side opposite the knot, to allow the knot to pass freely toward the periphery, where it will be quickly reduced by the energetic action of that part of the grinder. While this reduction of the knot or lump is going on at the feed side of the grinder, both the feeding and discharge are diminished by the knot crowding over the revolving disk against the discharge-aperture. By this yielding of the disk all danger of clogging is avoided, and at the same time the flow of unground fiber through the grinder is prevented, and if the fiber is tender and easily reduced it will flow freely through the grinder and occupy but little more space on the feeding than on the discharge side of the disk; but if the fiber is tough and grinds slowly it will accumulate on the feed side and crowd the disk over to the discharge side, retarding the discharge, the strong fiber being in this way subjected to, as it requires, more grinding action than the weaker fiber.

This machine is one which I have devised for carrying my process into effect; but it will be obvious to the skillful mechanism, particularly if skilled in the art of manufacturing paper, that the modifications of machinery which might be constructed to work this process would be very numerous, indeed, and it would be impossible even to enumerate them within the proper limits of a specification. I will, however, mention such as I have contemplated.

The cylinder and rotating disk might be elongated in the direction of their axis, so that instead of their diameters being greater than their lengths, their lengths might be greater than their diameters, and the periphery of each might be armed with a grinding-surface, leaving the ends of both armed or unarmed.

Again, the diameters of the ends of the revolving and hollow cylinders might be reduced in such manner as to give to them the proportions of the middle section of a spindle, or of two frusta of cones, united base to base; or, instead of being of a conical or spindle form, these parts may be made spherical.

What I claim as my invention, and desire to secure by Letters Patent, is—

1. The process, substantially as herein described, of reducing fibrous substances to pulp, suitable for making paper, while such fibrous substances are suspended in water, by subjecting them to the operation of grinding or beating action in a closed vessel, to which it is supplied by the hydraulic power of a descending column of water so charged with the fibrous substance, and permitting it to escape and be discharged so soon as it is sufficiently reduced, substantially as set forth.

2. Separating the fibers from the mass so soon as they are sufficiently reduced, and discharging them by the hydrostatic pressure of the column of water in which the fibers are suspended, and which, in flowing upward to the discharge, carries with it only the fibers which are sufficiently reduced, substantially as described.

JOSEPH KINGSLAND, Jr.

Witnesses:
Wm. H. Bishop.
Andrew De Lacy.